1,701,755

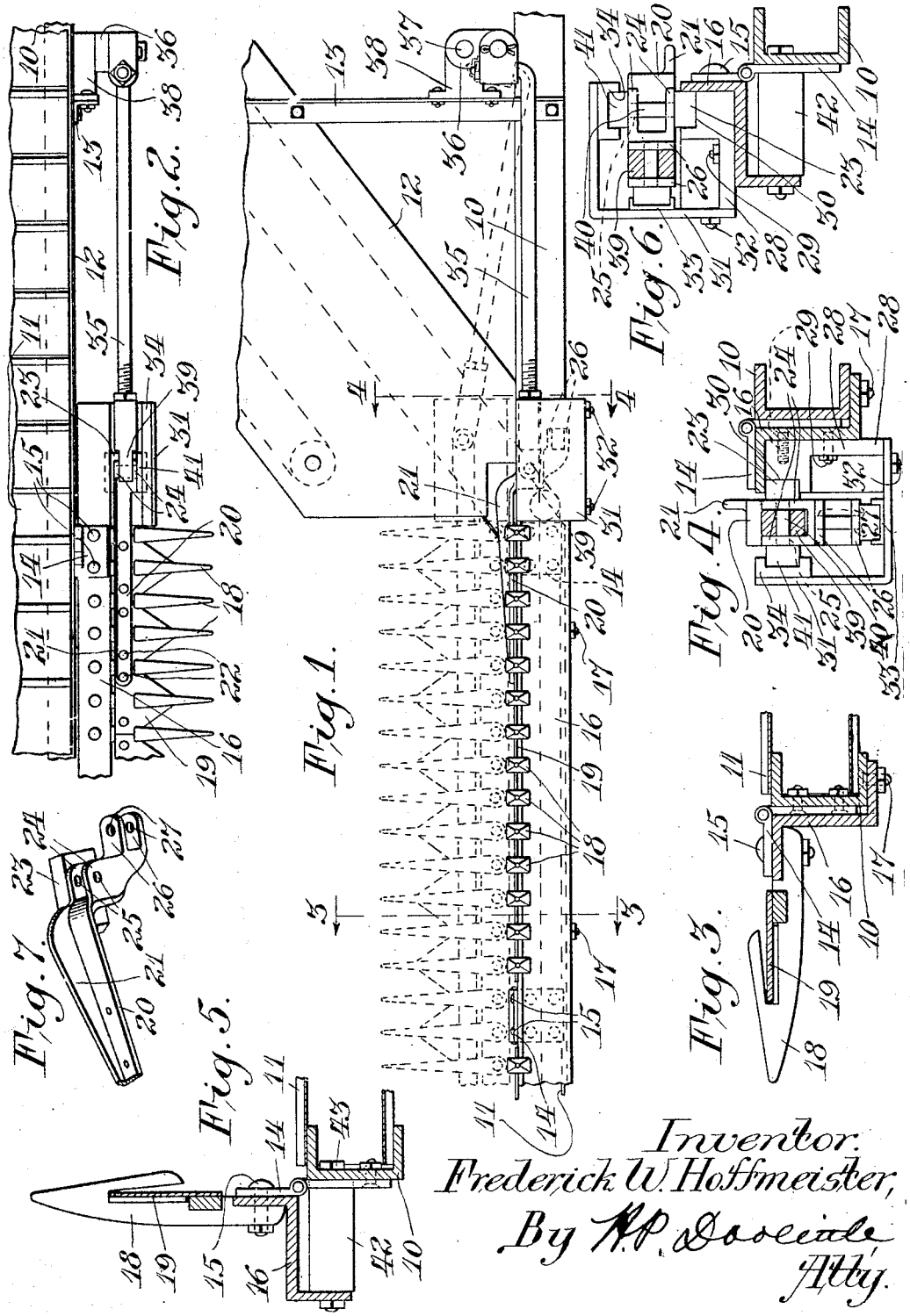
Feb. 12, 1929.
F. W. HOFFMEISTER
1,701,755
CUTTER BAR FOR HARVESTERS
Filed June 4, 1925
Inventor.
Frederick W. Hoffmeister, Patented Feb. 12, 1929.

UNITED STATES PATENT OFFICE.

FREDERICK W. HOFFMEISTER, OF CHICAGO, ILLINOIS, ASSIGNOR TO INTERNATIONAL HARVESTER COMPANY, A CORPORATION OF NEW JERSEY.

CUTTER BAR FOR HARVESTERS.

Application filed June 4, 1925. Serial No. 34,780.

The present invention relates to harvesters and especially to cutting mechanisms therefor.

Harvesters as now known in the art are provided with a conventional reciprocatory cutting mechanism which is disposed to operate in only a horizontal plane. It is desirable at times, and especially so in the case of harvester threshers, that such cutting mechanism be adapted for use in removing the heads from heavier grains, such as kaffir corn, and this cannot conveniently be done when the cutting mechanism is positioned horizontally.

Accordingly, it is an object of this invention to provide a cutting mechanism or a cutter bar for harvesters, and particularly harvester threshers, which is adapted to be positioned at the front end of the harvester platform for fixation to lie in any one of a plurality of planes with respect to the platform and independently of the platform, and to be operable for cutting in any such position.

It is a specific object of this invention to provide a cutter bar for harvesters and the like which is adapted for operation in either a horizontal or in a vertical plane.

A further object is to provide an improved driving mechanism which will operate such cutting mechanism in any of its positions.

Still another object is to provide a simply constructed and practicable device of the kind described which will be sturdy enough to operate efficiently for the purposes intended.

Briefly these objects are accomplished in the combination of a harvester having a platform in the provision of a cutting mechanism carried by hinges on the frame of a harvester platform and adapted to be secured thereto for operation in either a vertical or horizontal plane, and furthermore in the provision of an improved knife head for operating such cutting mechanism in any of these positions.

In the accompanying sheet of drawings wherein like characters of reference designate similar parts the preferred embodiment of this invention is illustrated and in these drawings,—

Fig. 1 is a front elevational view of a portion of a harvester frame and platform showing in full line position a cutter bar for operation in a horizontal plane and in a dotted line position the disposition of the cutter bar for operation in a vertical plane;

Fig. 2 is a plan view of the construction disclosed in Fig. 1;

Fig. 3 is a sectional view taken along the line 3—3, looking in the direction of the arrows as shown in Fig. 1 and showing the finger bar of the cutting mechanism in horizontal position;

Fig. 4 is a view taken through the driving mechanism along the line 4—4, looking in the direction of the arrows shown in Fig. 1 and showing the position of this mechanism when the cutting mechanism is in the horizontal position as shown in Fig. 3;

Fig. 5 is a view similar to Fig. 3, but shows the finger bar of the cutting mechanism raised to its vertical position;

Fig. 6 is a view similar to Fig. 4 and goes with Fig. 5 to show the position of the driving mechanism when the cutting mechanism operates in a vertical plane; and Fig. 7 is a detail, perspective view showing the improved knife head of this invention.

For the purpose of illustrating the preferred embodiment of this invention a conventional harvester has been disclosed. It comprises a main frame channel bar 10 supporting at its grainward end a platform conveyer 11 of the conventional slatted apron type and at its stubbleward end the channel bar supports the usual elevator 12, which inclines upwardly as shown and is further supported by a standard 13. Along the grainward end of the channel bar 10 and on its front face is secured a plurality of hinges 14 to which is secured as by means of bolts 15 a Z-bar 16 arranged in parallel with the channel bar 10, one leg of the Z extending rearwardly under the channel bar 10 and being secured thereto by means of counter sunk bolts 17. The forwardly extending ledge of the Z-bar 16 has secured thereto by the bolts 15 already mentioned the conventional fingers 18 forming with the ledge of the Z-bar the usual finger bar between the fingers of which is positioned a cutter bar 19 made up of the usual knife sections. So far there has been described the manner of mounting the finger bar and cutting mechanism in a horizontal plane on the front end of the platform of a harvester. Such horizontal position of the cutting mechanism is the common way employed in cutting standing grains in traveling harvesters.

The manner of driving or operating the cutting mechanism will now be described when the same is positioned horizontally. Reference in this connection is first made to Fig. 7 disclosing in perspective the knife head of this invention which comprises an extension 20 having a strengthening rib 21, the extension being riveted to the knife section cutter bar by means of rivets 22, as shown in Fig. 2, a guide block 23 being integrally fitted at the stubbleward end along one side of the extension 20, the extension 20 further being provided with a pair of integrally extending spaced side walls or ears 24 apertured at 25 as shown, the walls 24 being positioned to form a vertical space. Depending below these walls as an extension thereof and as an integral part of the knife head is a pair of horizontally extending, similar wall or ear members 26 to form a horizontal space therebetween, and also apertured similarly at 27. It will thus be seen that the knife head is provided with means in the form of a socket for horizontal connection, and at right angles thereto there is a similar socket extension for connection in a vertical position. Reference is made to Fig. 4 showing a block 28 secured by means of the counter sunk bolts 29 to the Z-bar 16 at its front side, the block 28 having a recessed head portion as at 30 disposed beneath the forwardly extending ledge of the Z-bar. A rectangularly shaped housing 31 having an under side and a front side is secured to the block 28 by means of threaded studs 32, which are carried by the block and protrude through the under side of the housing where they are secured by the nuts shown to hold said block in said housing. The sides of this housing are provided with a channeled guide member 33 at its bottom and a similar channeled guide member 34 disposed in alinement and oppositely with respect to the recess 30 in the head of the block 28. The knife head extension 20 having been connected to the knife sections, the pitman shown at 35, conventionally operated by a crank mechanism 36 operable by a shaft 37 journaled in a bracket 38 supported on the standard 13, having an eyed portion 39 at its grainward end, is inserted in position between the ears or vertical side walls 24, the eye in the end of the pitman registering with the apertures 25. A bolt 40 having an integral head 41 serving as a guide block is then inserted into these registering apertures and the driving connection for the cutting mechanism is complete for operating the same in a horizontal plane. As the pitman reciprocates the head slides therewith and is guided in this movement by the block 23 integral with the head and movable in the recess 30 and on its opposite side by the bolt head 41 movable in the guide member 34, as will be understood.

It is desirable at times, especially when these cutting mechanisms are employed on harvester threshers, to have such cutting mechanism disposed in a vertical plane when operating the harvester as a stationary thresher to remove the heads from the heavier grains, such as kafir corn for example, and accordingly this invention having such adaptation for a cutting mechanism in view provides the hinges 14 already described. By uncoupling the stubbleward end of the pitman from the crank 36, the cutter bar and knife head may be slid laterally in a stubbleward direction between the fingers to permit fixation of the pitman to the ears 26 of the knife head for operating the cutter bar in a vertical position when the Z-bar 16, after loosening of the bolts 17 may be pivoted upwardly to a vertical position. To retain the cutter bar rigidly in such vertical position as shown in Figs. 5 and 6, blocks 42 are provided to fill the space between the hinge and the downwardly turned ledge of the Z-bar and a bolt 43 is passed therethrough and through the frame pieces for rigidly securing the cutter bar vertically. The knife head will now have to be connected to the cutting mechanism and this time the horizontally disposed walls or ears 26, as stated, are brought into position and have their apertures 27 register with the eye in the end of the pitman, which has now been uncoupled as described. As shown in Fig. 6, the bolt 40 being inserted through the apertures, the head thereof will be guided in the member 34 as shown with the integral block on the knife head guided as before, that is, as in the horizontal position of the cutter bar in the recess 30 in the head of the block 28. One bolt 40 would be sufficient, that is, the bolt could be used for connection of the knife head to the pitman in either its horizontal or vertical position, but very likely it would be better to have two bolts as shown in these drawings, as the one not employed for connecting the pitman to the head will remain in its ear members and serve to make a more rigid construction for the entire device by sliding in its particular guide piece, such as the guide piece 34 shown in Fig. 6.

The operation of the mechanism has been quite adequately described as the description of the details thereof has progressed. Briefly summing up, however, it will be understood that the cutter bar may be secured in horizontal position to the frame of the harvester and be operated by the knife head and pitman shown and that the cutting mechanism may also be hinged to a vertical position and that the same knife head and pitman may be employed for the operation of the cutting mechanism in this position.

It should be understood that only the preferred embodiment of this invention has been disclosed and that the same is susceptible of change and modification without departing from the spirit of this invention as hereinafter claimed.

What is claimed is:

1. The combination of a harvester having a frame with a cutter bar carried thereon, and means for rigidly mounting said cutter bar on the frame to be positioned and operated in either a horizontal or a vertical plane.

2. The combination of a harvester having a frame, a cutter bar, means pivotally connecting the cutter bar to the frame, and means for rigidly securing said cutter bar on the frame for operation in either a horizontal or a vertical plane.

3. The combination of a harvester having a frame, a cutter bar, said cutter bar being pivotally connected to the frame, means for rigidly securing said cutter bar on the frame for operation in either a horizontal or a vertical plane, and a single means for operating said cutter bar in either position.

4. In a harvester having a platform carried on a frame member, the combination of a Z-bar hinged to said frame member, a cutter bar secured to the Z-bar, and means for fixing said cutter bar to the frame member to permit operation thereof in either a horizontal or a vertical plane.

5. In a harvester having a platform carried on a channel frame member, the combination of a Z-bar hingedly connected to said frame member, a cutter bar secured to one leg of the Z-bar in a horizontal position, means for securing the other leg of the Z-bar to the channel bar, said means being removable to permit hinging of the cutter bar to a vertical position, and means for securing said cutter bar to the channel bar in said vertical position.

In testimony whereof I affix my signature.

FREDERICK W. HOFFMEISTER.